Jan. 21, 1941.    S. S. MATTHES    2,229,333
TROLLEY WIRE FITTING
Filed April 19, 1938
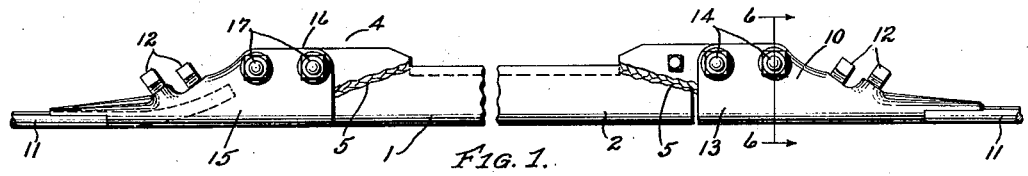
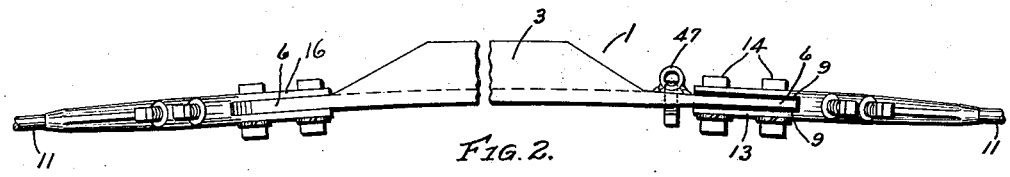
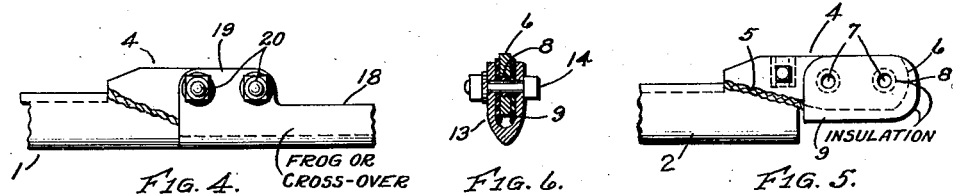
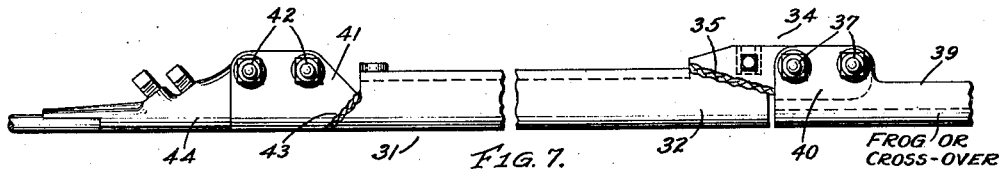
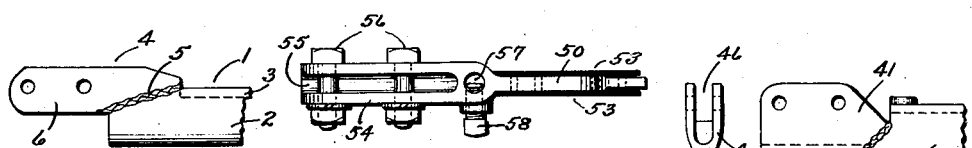
Inventor
SAMUEL S. MATTHES
By
Attorney Patented Jan. 21, 1941

2,229,333

UNITED STATES PATENT OFFICE 2,229,333

TROLLEY WIRE FITTING

Samuel S. Matthes, Mansfield, Ohio, assignor to The Ohio Brass Company, Mansfield, Ohio, a corporation of New Jersey Application April 19, 1938, Serial No. 202,872

6 Claims. (Cl. 191—39)

My invention relates to overhead trolley heads and has specific reference to devices for supporting and connecting parts of the system.

One object of my invention is to provide a device which is adapted to connect the ends of a trolley wire.

Another object of my invention is that the said devices shall be more or less rigid and adapted to a straight line or curved construction.

Another object is to provide a device adapted to be attached to cross-overs, trolley switches, frogs, etc.

Another object is to provide a device in which the connected parts may be in insulated relation.

My invention resides in the new and novel construction, combination of elements and relation of the parts hereinafter described and shown in the drawing accompanying the specification and particularly set forth in the claims.

In the drawing:

Fig. 1 shows a view in elevation of my improved device with wire attaching means at each end.

Fig. 2 shows a top view of Fig. 1.

Fig. 3 shows the left-hand end of Fig. 1 without wire attaching means.

Fig. 4 shows the right-hand end of Fig. 1 attached to the arm of a trolley switch or crossover.

Fig. 5 shows the right-hand end of Fig. 1 without wire attaching means.

Fig. 6 is a transverse sectional view on the line 6—6 of Fig. 1.

Fig. 7 is a side view of my invention having the left-hand end arranged with a clevis to receive a tongue on a wire holder having a projecting tongue as in Fig. 3 and the right-hand end being insulated and arranged as in Fig. 5 to receive the clevis end of a switch or of a crossover or wire holding device shown in Fig. 1.

Fig. 8 is a top view of Fig. 7.

Figs. 9 and 10 show the construction of the left-hand end of the segment portion in Figs. 7 and 8 and the end view of the segment respectively.

Figs. 11 and 12 show side and top views respectively of a modification of my invention.

In overhead constructions for trolley bus operation many new problems were met with and are presenting themselves in practically each new installation.

This is due largely to the bus not following a line of travel directly beneath and conforming to the direction of the installed trolley wire. This requires the trolley head carrying the current collector, to pivot about a vertical axis.

This pivotal movement requires a very exacting overhead construction, one which is substantial and will "stay put" when installed; also, the overhead frogs or switches are almost exclusively of the electrically operated types as the current collector is capable of navigating the ordinary type of frogs or switches only in very exceptional cases on account of its pivotal support.

The system requires a double trolley wire of positive and negative polarity.

The above conditions and others require special devices and also installation at many points not required in the ordinary overhead constructions using a single trolley wire and a grounded negative, and my invention is designed to meet many of the new requirements.

In the preferred embodiment of my invention, I provide a segment or bar I which I have shown as slightly curved although it may be found in some cases that the member I is more useful if made straight.

The bar I has a vertical member 2 and a lateral member 3 which maintains the curvature when the bar is used in a curved condition but which may not be necessary when the bar is used straight.

The bar I may be made of what is commercially known as rolled angle bar although it may be formed of malleable cast iron or of two separately formed members welded together at their meeting edges.

The member 3 is cut away at a point back from each end as conditions may require.

Referring to Figs. 1 and 2, the right-hand end of the bar I is provided with a projecting tongue 4 (Fig. 5) which is welded to the member 2 in alignment therewith, as indicated at 5, and of substantially the thickness of the member 2. The projecting portion 6 of the tongue is provided with two through openings 7 which are bushed with insulating tubes 8 and having side plates 9 of insulating material to insulate the parts 2 and 10.

To the tongue 4 may be secured the trolley wire holding tip 10 adapted to receive the trolley wire 11 and having the screws 12 for locking the trolley wire in place.

The tip 10 has a clevis end 13 to receive the projecting portion 6 of the tongue 4 to attach the tip to the bar I in insulated relation thereto by means of the bolts 14.

The left-hand end of Figs. 1 and 2 has a projecting tongue 4 (Fig. 3), as above described, welded to the member 2 at 5 and having a projecting portion 6, but there is no insulation 8 and 9, and the trolley wire holding tip 15 has its clevis portion 16 arranged to fit the portion 6 without the interposed insulation. The tip 15 is held in place in electrical contact with the bar 1 by means of the through bolts 17.

In Fig. 4 is shown the right-hand end of the bar 1 attached to an arm on a trolley switch or cross-over, both devices being well known to those skilled in the art, and having means at the other ends thereof to receive a trolley wire. The end of the switch arm 18 is formed with a clevis 19 which receives the tongue 4 and is held in place by the bolts 20. The clevis 19 is arranged to be insulated from the tongue 4 as in the case of the trolley wire tip 10 (Figs. 1 and 2).

The bar 1 may have a switch or a cross-over attached to each end thereof if desired.

In Figs. 7 and 8 a modified form of my invention is shown in that the bar 31 is provided with a vertical member 32 and a lateral bracing member 33, but this bracing member is not necessary when the bar is formed straight.

The member 33 is cut away at a point back from each end of the member 32 as conditions may require.

The right-hand end of the member 32 is provided with a projecting tongue 34 which is welded to the member 32 in alignment therewith as indicated at 35 and is of substantially the same thickness as the member 32. The projecting portion 36 of the tongue is provided with transverse openings to receive the bolts 37 and which openings are bushed with insulation as in Figs. 5 and 6. The tongue is also provided with insulating plates 38.

To one end of the member 32 is shown attached an arm 39 of a trolley switch, frog or cross-over and which arm is provided with a clevis 40 such as the clevis 19 of the arm 18 in Fig. 4. A cross-over or switch may be secured to the other end also of bar 32.

The left-hand end of the bar 31 is provided with a clevis 41 (see Figs. 9 and 10) and having registering openings to receive the through bolts 42. This clevis construction may be made at the right-hand end of Figs. 7 and 8 in place of the tongue 36.

The clevis end is constructed by forming a U-shaped member of metal and welding it to the bevelled end of the member 32 as at 43.

The trolley wire holding device 44 is provided with an integrally formed tongue 45 similar to the tongue 4 of Fig. 3 and of such size as to properly fit in the groove 46 of the clevis 41 and in electrical contact with the clevis. The device 44 is held by the bolts 42.

In the above described devices the insulation may be omitted, if desired, and the bars 1 and 31 used as live spacers or connectors.

The insulated plates 9 and 38 may be attached to the bar ends by means of a suitable cement, such as, formed of a synthetic resin or by means of a suitable glue in order that the bars 1 and 31 and the insulation therefor may form a unitary product. The insulating bushings and plate are preferably formed of fibrous material impregnated with Bakelite or a synthetic resin.

The bars 1 and 31 are provided with a connector 47 to receive a conductor.

In Figs. 11 and 12 I have shown another embodiment of my invention from that shown in Figs. 7 and 8 in that the clevis and tongue are integrally united and closely coupled practically eliminating the intervening bar 31.

In this last embodiment I employ a tongue 50 having openings provided with insulating bushings 51 which in turn are provided with openings 52 to receive transversely disposed securing means similar to 14 in Fig. 1. On opposite faces of the tongue 50 are insulating plates 53 provided with openings corresponding with openings 52 in the bushings 51. The tongue 50 may take an attachment 10 or a cross-over or frog end 39 in which case the lower edges of the fitting 10 or 39 will continue to guide the current collector after it leaves the clevis 54 and vice versa.

The plates 53 may extend beyond the edges of the tongue 50 and clevis 13, as shown in Fig. 6, to give ample insulation between the parts.

The clevis 54 has a groove therein 55. The clevis 54 is provided with openings to receive the through bolts 56 and is adapted to couple to a device as 44 in Fig. 7.

To the clevis 54 may be attached a bar or other device provided with a tongue, the bolts 56 holding the same in place. If desired, the frog or cross-over may be provided with tongues for attaching them to the clevis end 54. The device shown in Figs. 11 and 12 permits close coupling between two overhead devices and maintaining them in insulated relation, or by suitable bar or connecting means the devices to be connected may be of some distance apart.

The spacer shown in Figs. 11 and 12 is provided with an opening 57 to receive a tap wire held by screw 58.

The member 31 is provided with a transverse member 48 welded thereto for attaching the supporting means to the device.

The left hand end of the spacer shown in Figs. 1 and 2 may be provided with insulation as in the case of the right-hand end thereof.

The lower edges of the devices shown in the drawing are constructed to smoothly guide a current collector thereacross.

The frog or switch and the cross-over referred to above are represented in U. S. Patents— Matthes, 1,682,136 and Gilman 849,994.

This application is a continuation in part of my co-pending applications, Serial Number 56,973, filed December 31, 1935, and Serial Number 59,-538, filed January 17, 1936, now Patent 2,127,485, dated August 16, 1938.

While I have described and shown the spacer or connecting bar as connecting certain specific devices used in overhead construction, it will be evident my invention may be used for other purposes for which they may be adapted.

Having described my invention, I claim:

1. A spacer for overhead trolley systems comprising a metal body having attaching means at each end, one attaching means comprising a U-shaped clevis having an end wall at one end and a running surface below to guide a current collector and adapted to receive a tongue shaped end on a trolley wire attachment, transverse openings through the side walls of the clevis to receive means for securing the tongue to the clevis, the other attaching means comprising a tongue projecting in alinement with the clevis from the said end wall to receive a U-shaped clevis end on a trolley wire attachment, the tongue offset in a vertical direction relative to the running surface of the U-shaped clevis to permit the lower surface of the last said clevis to match with that of the first said clevis, transverse openings through the tongue to receive holding means to secure the clevis shaped end to the tongue, means between the tongue and clevis to receive a conductor, a tubular bushing of insulating material surrounding that portion of each of the holding means positioned in said openings to insulate the holding means from the spacer, side plates of insulating material associated with the side faces of the tongue to insulate the clevis shaped end on the trolley wire attachment, the insulating plates having openings corresponding with those in the tubular bushings.

2. A spacer for connecting trolley wire devices in an overhead system comprising an exposed metal body having attaching means at each end to connect to said trolley wire devices, the means at one end being a clevis having an end wall and a bottom wall, the clevis being open on top and at one end, the means at the other end being a tongue projecting from the end wall and each means having side faces of extended area and also having one or more transverse openings to receive means for securing the said devices thereto, plates of insulating material secured to the said faces of at least one attaching means and means for insulating the surfaces of the openings through at least said one attaching means to insulate the spacer from one trolley wire device and to insulate both trolley wire devices from each other, the said tongue projecting longitudinally of the devices and being offset with respect to the lower surface of the spacer whereby the lower surface of the spacer and that of the connected device will coincide as to alignment for smooth guidance of a current collector.

3. A unitary spacer for connecting two trolley fittings in an overhead trolley system comprising a metal body member provided with two means for attachment thereto, one means comprising a clevis with spaced walls and closed at the bottom side and at one end by walls, the other means comprising a tongue projecting from the said end wall in alignment with the clevis, transverse openings through the attaching means to receive means to secure the overhead trolley wire fittings thereto, the openings of one said attaching means provided with tubular bushings of insulating material, plates of insulating material associated with the spacer body and arranged for positioning between the last referred to attaching means and the fitting secured thereto, the said bushings and plates arranged to maintain the attached fitting and body member in insulated relation, one attaching means being offset vertically with respect to the other attaching means whereby the surface of the lower wall of the associated fitting will align with the surface of the lower wall of the other attaching means.

4. A unitary spacer for connecting two trolley fittings in spaced and insulated relation comprising in combination a metallic body member having a clevis at one end with spaced side walls and an end wall and a bottom wall, the lower surface of the latter arranged to guide a current collector, a tongue projecting longitudinally from the exterior side of the end wall and in alignment with the central longitudinal axis of the body, one edge of the tongue being offset vertically from the aforesaid lower surface of the bottom wall for the purpose described, one or more transverse openings through the said side walls and through the tongue to receive securing means, each side face of the tongue provided with a plate of insulating material fixedly associated therewith and extending beyond one edge of the tongue and insulating bushings positioned in each transverse opening through the tongue, whereby the tongue may be positioned in the clevis of one of the said fittings and secured therein in insulated relation thereto.

5. A spacer for connecting two trolley fittings for use in an overhead trolley system in spaced and insulated relation comprising in combination a metallic body member having a clevis at one end with spaced side walls and an end wall and a bottom wall, the bottom wall adapted to guide a current collector, a tongue projecting longitudinally from the end wall in alignment with the longitudinal axis of the clevis, the lower edge of the tongue being offset vertically from the lower edge of the bottom wall, the spacer to receive the clevis end of one of the trolley fittings and whereby the lower portion of the fitting adjacent the spacer clevis may conform thereto in thickness and in alignment of lower surfaces, one or more transverse openings through the said side walls and tongue of the spacer to receive securing means, each side face of the tongue provided with insulation and insulating bushings positioned in each transverse opening of the tongue whereby the tongue may be secured in the clevis of one of the fittings and secured therein.

6. A spacer for overhead trolley systems comprising, a metal body having a U-shaped clevis to receive a tongue shaped end on a trolley wire fitting, the clevis being closed by a wall at one end thereof and by a wall along the lower edge, the latter wall adapted to guide a current collector, a tongue projecting from the closed end of the clevis and adapted to be received by a U-shaped clevis on a trolley wire fitting with the adjacent ends of the two clevises in longitudinal alignment, the lower edge of the tongue being spaced vertically from the lower edge of the spacer clevis whereby the lower edge of the clevis on the fitting may align vertically with that of the spacer clevis, plates of insulation extending along the side faces of the spacer tongue to insulate the said faces of the tongue from the adjacent inner side faces of the attached clevis on the fitting, the combined thickness of the tongue and plates of insulation being less than the width of the first said clevis whereby the juxtapositioned clevises may be of the same width, registering transverse openings through the spaced walls of the clevis and through the tongue of the spacer to receive means to secure the spacer to the fittings and insulating tubular bushings in the openings of the tongue through which the securing means extend to insulate the securing means from the tongue.

SAMUEL S. MATTHES.